United States Patent [19]

Berstein

[11] Patent Number: 5,235,838
[45] Date of Patent: Aug. 17, 1993

[54] METHOD AND APPARATUS FOR TRUING OR STRAIGHTENING OUT OF TRUE WORK PIECES

[75] Inventor: Garri Berstein, Erkelenz, Fed. Rep. of Germany

[73] Assignee: W. Hegenscheidt Gesellschaft mbH, Erkelenz, Fed. Rep. of Germany

[21] Appl. No.: 826,651

[22] Filed: Jan. 22, 1992

Related U.S. Application Data

[63] Continuation of Ser. No. 594,829, Oct. 9, 1990, which is a continuation of Ser. No. 217,552, Jul. 11, 1988, Pat. No. 5,001,917.

[30] Foreign Application Priority Data

Jul. 13, 1987 [DE] Fed. Rep. of Germany ....... 3723097
Sep. 24, 1987 [EP] European Pat. Off. ......... 87113938.2

[51] Int. Cl.$^5$ .............................................. B21D 3/16
[52] U.S. Cl. .................................. 148/510; 72/342.5; 72/110; 148/525
[58] Field of Search ............. 72/110, 53, 342.1, 342.5, 72/342.6, 342.94; 148/145, 146

[56] References Cited

U.S. PATENT DOCUMENTS

| | | | |
|---|---|---|---|
| 1,986,426 | 1/1935 | DeBats | 72/53 |
| 3,377,214 | 4/1968 | Woodbrige et al. | 148/146 |
| 4,034,585 | 7/1977 | Straub | 72/53 |
| 4,226,111 | 10/1980 | Wahli | 72/53 |
| 4,416,130 | 11/1983 | Judge, Jr. | 72/76 |
| 4,561,276 | 12/1985 | Berstein | 72/110 |
| 4,860,566 | 8/1989 | Augustin | 72/110 |

FOREIGN PATENT DOCUMENTS

| | | | |
|---|---|---|---|
| 248626 | 2/1961 | Australia | 148/145 |
| 0213256 | 3/1987 | European Pat. Off. | |
| 101228 | 6/1984 | Japan | 72/110 |
| 24319 | 2/1985 | Japan | 72/110 |
| 62-253722 | 11/1987 | Japan | 72/53 |
| 730550 | 4/1980 | U.S.S.R. | 72/110 |
| 957805 | 5/1964 | United Kingdom | 72/110 |
| 1004962 | 9/1965 | United Kingdom | 72/110 |

OTHER PUBLICATIONS

*Machine Design*, "Fillet Rolling"; by W. Egger and G. X. Diamond; pub. on Jan. 5, 1961; pp. 112–119.
*Steel*, "Peening Cuts Stress Corrosion"; pub. on Dec. 21, 1959; p. 88.
Article Entitled: *"Gezieltes Haerten Durch Laserlicht"* by F. U. Meis et al. (Aimed Hardening by Laser Light), published in Industrie Anzeiger, Nrs. 56 & 57, Jul. 20, 1985, pp. 29, 30, and 31.
Article Entitled: *"Moeglichkeiten der Oberflaechenveredelung Durch $CO_2$-Laser"* (Possibilities of Surface Finishing by $CO_2$-Lasers) by H. W. Bergmann, vol. 1, No. 1, 1985, pp. 136 to 141, published in Opto Elec-tronik Magazin.
Article Entitled: "Schwingfestigkeitsoptimierung Von Gesenkschmiedeteilen Durch Randschichtverfestigungsverfahren" (Optimizing Vibration Strength of Dropped Forged Parts by Surface Layer Strengthing Methods) by K. H. Kloos, VDI Berichte, pp. 113 to 140, published in VDI-Berichte (date not known).

*Primary Examiner*—Lowell A. Larson
*Assistant Examiner*—Donald M. Gurley
*Attorney, Agent, or Firm*—W. G. Fasse; D. H. Kane, Jr.

[57] ABSTRACT

In a straightening or truing operation for straightening out of true work pieces the characteristic fatigue strength or an increased fatigue strength achieved in a previous strengthening operation of the work piece to be straightened, is maintained. This is achieved by a truing operation, wherein locally bounded compressive residual stresses are induced in a surface layer zone of the work piece by a hardening operation, whereby the respective out of true deformation of the work piece is at least reduced. The truing operation may then be repeated until the out of true deformation is eliminated. The compressive residual forces are induced in a surface layer zone of the work piece by a locally bounded hardening operation or a strengthening rolling operation. By appropriately varying the extent of hardening or the rolling force respectively, the magnitude and angle of any out of true deformation may be affected so as to be even completely eliminated, for example.

12 Claims, 5 Drawing Sheets

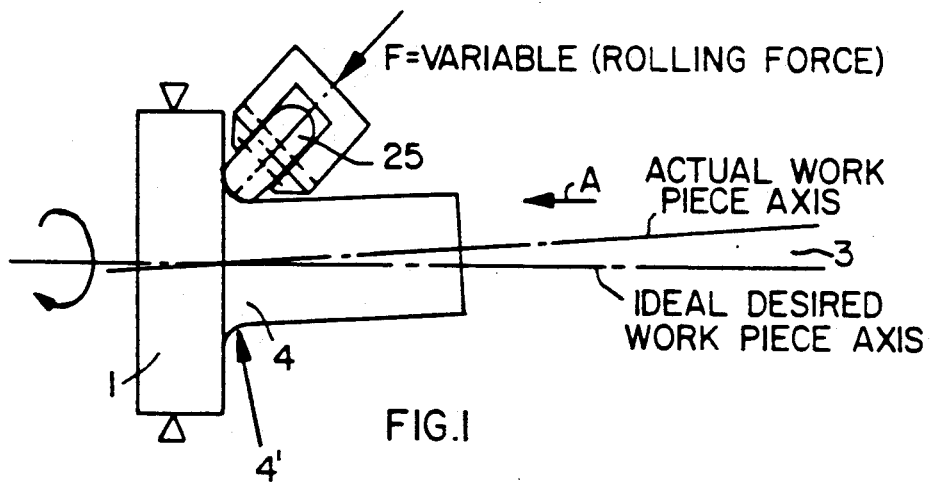
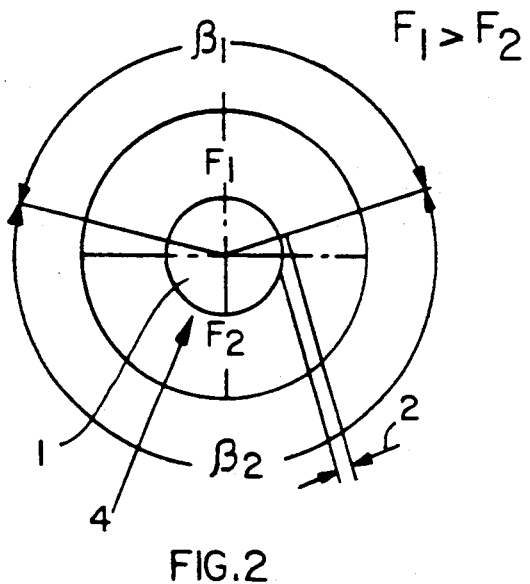
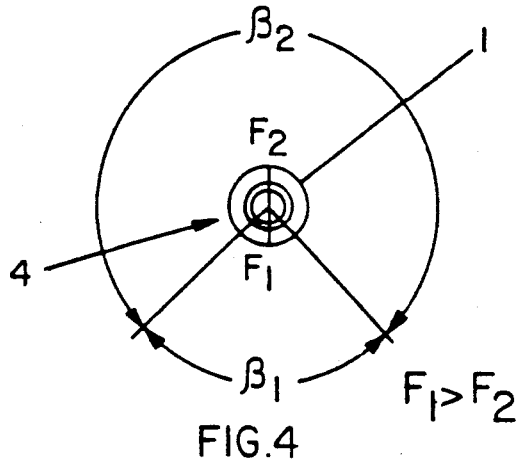
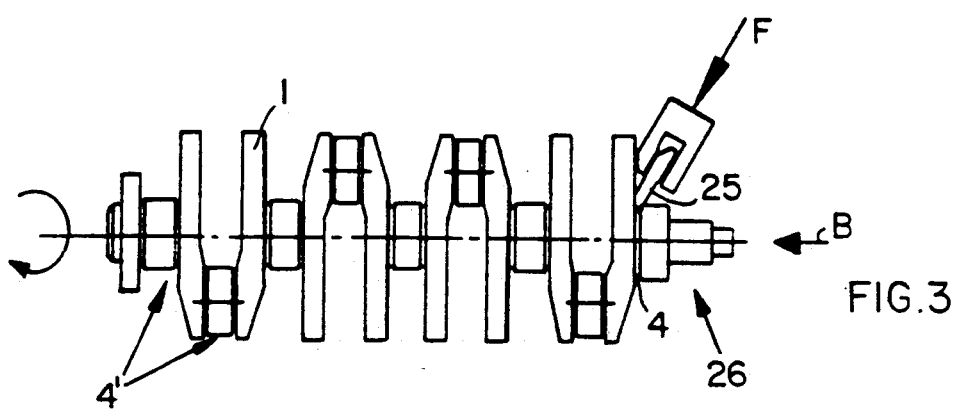

METHOD AND APPARATUS FOR TRUING OR STRAIGHTENING OUT OF TRUE WORK PIECES

This application is a continuation; of application Ser. No.: 07/594,829, Oct. 9, 1990, which is a continuation of application Ser. No.: 07/217,552 filed: Jul. 11, 1988 now U.S. Pat. No. 5,001,917.

FIELD OF THE INVENTION

The invention relates to a method of truing or straightening work pieces which are bent or out of true. The disclosure further describes an apparatus for carrying out the present method.

DESCRIPTION OF THE PRIOR ART

Methods for straightening or truing structural components or machine parts which are bent or out of true, are generally known. In general, the prior methods treat components or work pieces which are bent in one direction and hence require straightening or truing by means of an appropriate back-bending in the other direction. In order to achieve this, the work piece is normally supported on two support blocks and then a sufficiently great force is applied to the work piece in the area of its greatest bending deformation between the two support blocks, whereby the force is applied in a radial direction opposite to the bending direction until the corresponding elastic deformation range is exceeded and a plastic deformation is caused. The result of such a straightening operation is then measured and the straightening operation is repeated if necessary at the same location or at another location and perhaps with a different applied bending force until the work piece has been sufficiently straightened or trued.

The above mentioned conventional method of straightening or truing work pieces has several disadvantages. One important disadvantage is seen in that such a straightening operation has undesirable and detrimental effects on the internal stress pattern of the work piece, which stress pattern results in a reduced mechanical strength and/or a reduced fatigue strength limit.

It is clear that especially work pieces or components which will be subjected to a dynamic loading, may not be straightened in a truing operation which reduces the respective fatigue strength of the work piece. Otherwise, the dimensions of the work piece must be correspondingly increased to achieve the required final fatigue strength. It is often not possible to increase the dimensions of a work piece to achieve a higher strength and in any event, such an increase in dimensions leads to an uneconomical production. The above described state of the art straightening method has an especially negative effect on work pieces which have previously been treated to increase their fatigue strength. Usually, the above described straightening method completely negates the increased fatigue strength which had been achieved in the work piece and thereby makes the strengthening pretreatment senseless or meaningless. A method which achieves satisfactory straightening or truing of the work pieces while at least avoiding the reduction of the fatigue strength of the work piece is not previously known.

OBJECTS OF THE INVENTION

In view of the foregoing it is the aim of the invention to achieve the following objects singly or in combination:

to simplify and improve the results of a method for straightening or truing work pieces;

to avoid reducing the strength, especially the fatigue strength of a work piece straightened or trued according to the present method;

to avoid cancelling or negating the effects of a strengthening pretreatment which increased the fatigue strength of a work piece prior to being straightened by the present method;

to cause compressive residual stresses in specified, bounded areas of a surface layer in order to effectively and accurately straighten an out of true work piece;

to make sure that the forces needed for the truing are applied where they are most effective for the intended purpose; and to provide an apparatus for carrying out this method.

SUMMARY OF THE INVENTION

The above objects have been achieved in a method for truing or straightening out of true work pieces according to the invention, by applying forces to the work piece in a locally limited area, whereby these forces are sufficient to locally strengthen the work piece to cause compressive residual stress in a surface layer zone of the work piece at least for reducing the out of true deviation or the bending of the work piece. The compressive residual stress may be generated in the surface layer zone of the work piece in various known manners and by various known means. An example of such a known manner of achieving compressive residual stress in a surface layer zone, is the so-called surface hardening which may, for example be carried out as a case hardening operation, or as an induction hardening operation, or as a laser beam hardening operation. Alternatively, the compressive residual stress in the surface layer zone may be caused by means of nitriding or nitridation. A further alternative for inducing compressive residual stress in the work piece is a commonly known deep rolling operation.

When the compressive residual stresses are induced in the material of the work piece, it must be assured that these forces do not extend through the entire grain structure, but rather that they arise to any considerably extent only in a surface layer zone of the work piece. The prevailing or induced compressive residual stresses cause a corresponding deformation of the work piece. The direction of this deformation depends, among other factors, on the fact to which specific surface area of the work piece the forces for inducing compressive residual stresses have been applied. The deformation magnitude or straightening magnitude of the work piece is dependent on how strong the compressive residual stresses are and how deep the compressive residual stresses reach into the surface layer zone. In order to achieve a desired straightening or truing effect, the compressive residual stresses must be induced in the work piece in a defined locally bounded area. This may be achieved, for example, by means of a locally limited induction hardening process, or by means of a locally limited deep rolling operation. In these operations, it is not critical how the local limiting or bounding of the strengthening effect is achieved only that it is limited to the proper area. For example, for work pieces having a rotational axis it is possible to harden the work piece within a defined axial limit, but around the entire circumference within such axial limit, and to a necessary or desired hardening depth so as to achieve the selected hardness. This effect could also be achieved by deep rolling with a selected specific rolling force. In the case of such a deep rolling operation, a further possibility for influencing or controlling the hardening results, is given by varying the number of rolling passes.

The local limiting of the hardening or strengthening in a surface layer zone for inducing compressive residual stresses may alternatively be achieved if, for example, the hardening or deep rolling operation is not carried out around the entire circumference in the circumferential direction. Such circumferential limiting is independent of the axial extension over which the hardening operation or the deep rolling operation is carried out. However, a circumferential angular range of at least 10° should be treated or hardened in order to achieve any effect worth mentioning, in the work piece.

For any work pieces which have cross-sectional area transitions and especially for work pieces additionally having a rotation axis, a notch effect may arise at the edges of the transitions. In such cases it is advantageous to carry out a hardening of the surface layer zone of the work piece for inducing compressive residual stresses in the notch region of the respective transitions. Typical examples of work pieces having cross-sectional transitions include the transitional concave fillets of axle journals, steering knuckles, crank shafts or cam shafts or other similar work pieces. It is quite simple and favorable to harden or deep roll these areas. Furthermore, it is also quite simple to carry out a hardening or deep rolling operation for inducing compressive residual stresses in the area of the concave fillet over an angular range smaller than the entire circumference of the concave fillet. The appropriate limited angular range should, however, be at least 10° as mentioned above.

For relatively simple, and for example, rotationally symmetric work pieces such as, for example, stepped shafts, it is to be expected that if compressive residual stresses are induced over a limited circumferential angular range in the area of a shoulder or notch, for example in the area of a transition concave fillet, in such a manner that the residual stress also arises in the two neighboring work piece zones, then a corresponding deformation reaction of the work piece also arises in the plane in which the angle bisector of the circumferential angular range lies over which the compressive residual stresses were induced.

For a more complex component, such as, a crankshaft, the size, shape, and position of neighboring elements of the crank shaft, such as a crank web, may additionally influence the deformation direction of a deformation which is caused by inducing the compressive residual stresses as described above. However, such effects may easily be empirically determined, so that it is always possible to induce or cause the compressive residual stresses, or to increase the original compressive residual stress in such a circumferential sector that an intended deformation of the neighboring work piece regions is achieved. Thus, the original out of true deformation and the purposely applied straightening deformation have such directions that a vectorial addition of the two deformations results at least in a smaller "out of true" or bend in the work piece. The straightening or truing out of true work pieces by inducing compressive residual stresses in the work piece at appropriate locations for achieving the desired straightening effect may also effectively be used if the work piece to be straightened has already been prehardened. However, in such a case it is necessary to achieve higher compressive residual stresses and/or a deeper surface layer zone affected by the compressive residual stresses relative to the previously existing hardening of the work piece. For example, it is possible to use a deep rolling operation for straightening a work piece which has previously been deep rolled in order to increase its fatigue strength, provided that the straightening rolling operation is carried out at a higher specific rolling force than that of the previous deep rolling operation or, alternatively, with the same specific rolling force, but a higher absolute rolling force. Even with an increased specific rolling force, it is possible to avoid that the resulting compressive residual stresses penetrate to a greater depth than necessary for the straightening by properly arranging the rolling roller. Instead, it is the aim of the invention to increase the compressive residual stresses which already exist in the surface layer zone. This may be achieved, for example, with a deep rolling roller having a smaller diameter than the deep rolling roller used in the original deep rolling operation. According to so-called Hertzian compression or Hertzian stress rules, the specific rolling force applied to the work piece, is increased while the same absolute rolling force is applied to the roller. If the reduction of the diameter of the rolling roller by itself is not sufficient to increase the specific rolling force as desired, then the absolute rolling force may additionally be increased.

Alternatively, when the diameter of the rolling roller is increased, a reduced Hertzian compression or stress and hence a reduced specific rolling force is applied to the work piece. By increasing the absolute rolling force the same specific rolling force can again be achieved which was also originally applied with a smaller roller in the previous deep rolling operation. Thus, it is achieved that the compressive residual stresses in the surface layer zone are not increased in size, but rather extend deeper into the surface layer zone. In this context, it is respectively irrelevant whether the strengthening operation for increasing the fatigue strength of the work piece was carried out prior to the straightening operation or instead substantially simultaneously with the straightening operation. It is simply necessary to view the specific power or force data of the respective measures applied for increasing the fatigue strength of the work piece as a starting point for then varying these force data as necessary to induce the desired locally bounded increased compressive residual stresses.

If a deep rolling operation is carried out, for example, in the area of a transition concave fillet of an axle journal in order to increase the fatigue strength of the axle journal and it is determined that the axle journal is out of true or has a deformation of a determined size and in a determined direction, then it is possible, for example, to reduce the rolling force by a necessary amount over the previously applied rolling force during the rolling operation at an appropriate or corresponding location for achieving the desired effect. This force increase is only necessary over a portion or a certain circumferential angle in the circumferential direction. Thereafter, the force is again reduced to the value determined for achieving the desired fatigue strength. Analogeous considerations hold true for a hardening operation of, for example, an axle spindle bolt or steering knuckle pin.

The straightening method according to the invention is especially advantageously applicable to mass production of a large number of identical work pieces. For example, in the mass production of a specific crank shaft, it might be determined, that the various successive machining or manufacturing steps for producing the crank shaft result in an undesirable bend or out of true deviation in a specific direction and with a specific magnitude. In such mass production the magnitude and direction of any resulting out of true deviation of the work piece will remain essentially constant for a whole series of identical work pieces. It is then quite a simple matter to determine by appropriate experiments or tests during the start up of a mass production series, at which locations and to what magnitudes compressive residual stresses must be induced in the work piece in order to achieve the desired straightening effect in the work piece, such as a crank shaft. Once the data necessary for controlling the induction of compressive residual stresses are established, these data may be stored as a fixed program and may then be carried out repeatedly by an appropriate apparatus. In this context, any necessary equipment may then be especially simple in construction, because in this case the apparatus is not required to include appropriate testing means and measuring means for determining the actual shape of the crank shaft. Furthermore, separate means for monitoring or checking the respective results of the straightening operation are also no longer required. Random sampling testing is completely sufficient for monitoring or controlling the results of the straightening operation according to the invention.

In order to carry out the straightening operation in general, at least one measurement operation must be carried out on the work piece in order to determine the location, magnitude and direction of any out of true deviation of the work piece. Then the straightening operation is carried out dependent upon the data determined in the above mentioned measurement operation. For crank shafts, the angular range over which the compressive residual stresses are to be introduced in the circumferential direction of a notch region, for example, a transition concave fillet, is determined at the main bearings and/or the connecting rod bearings.

After the straightening operation has been carried out a first time or in a first pass, the result of this first straightening pass may be determined and, if necessary, a further straightening may be carried out with appropriately adjusted straightening data. In this context, "adjusted straightening data" means that several factors may be respectively varied as needed singly or in combination including the specific rolling force, the absolute rolling force, the number of rolling passes the rolling pass speed, the drive current magnitude, the rotational angular position of the effective direction of the rolling force, and the axial position of the effective location of the rolling force. Analogous considerations apply where the necessary compressive residual stresses are induced by means of a hardening operation. The respective magnitudes of the desired adjustments or changes may be prescribed in a fixed manner, so that constant adjustment steps are carried out. However, it is alternatively possible, to make the type and magnitude of a necessary adjustment dependent on the results of the previous straightening operation. In order to achieve this, a corresponding apparatus must be provided with an appropriate deformation measuring system. Then a computer cooperating with the apparatus can determine the parameters of the next straightening operation based on the results of a previous straightening operation in a step by step manner. The computer generated straightening parameters are then input to an appropriate machine control.

In the straightening method according to the invention, especially when applied to essentially cylindrical lengthwise extending work pieces, it is suggested, that compressive residual stresses are induced in the work piece surface opposite the out of true bending direction, that is to say, on the inside surface of an out of true bend, for example by means of a rolling operation. This rolling operation may be carried out as a plunge type rolling operation or as a feed advance rolling operation.

According to the invention crankshafts are very effectively straightened or trued. In this context, it is especially advantageous, if the out of true deformation of the crank shaft to be straightened is measured at several locations and then the straightening operation is first carried out in the area having the largest deformation.

For carrying out the method according to the invention, the present apparatus of the invention includes at least one work piece clamping device arranged on a machine base. The present apparatus further has several additional components including some type of means for applying the forces that will induce the required compressive residual stresses in a surface layer zone of the work piece, an arrangement for achieving a relative motion between the work piece and the force applying means, position sensors between the work piece and the last mentioned arrangement for achieving a relative motion, and a control system for controlling the operation dependent on the data output by the position sensors and other data, which determine the location and magnitude of the compressive residual stresses to be induced. If the compressive residual stresses are to be induced or caused by means of a rolling operation, then the above mentioned force applying means include a force activated rolling tool with at least one rolling roller and an arrangement for controlling the rolling force. A rotational motion of the work piece causes the above mentioned relative motion between the roller and the work piece, whereby the necessary rolling process is carried out. Furthermore, there may be provided pass or displacement controlled movable carrier means for achieving an additional relative motion between the work piece and the rolling tool according to a predeterminable motion sequence and at predeterminable positions. A pass controlled carrier may be necessary, for example, for separate rolling tools to move the rolling roller of each rolling tool into a correct axial position and then to carry out a radial motion of the rolling tool to at least move the roller toward the work piece until it contacts the work piece. Then the rolling force control must provide the correct rolling force as well as the correct rolling force alternation or adjustment in order to achieve the desired straighting effect.

An apparatus for carrying out the method according to the invention may advantageously simultaneously include a deformation measurement system having at least one measuring element for determining the work piece out of true deformation at predetermined or predeterminable positions. The deformation measuring system is connected with a data evaluating arrangement, which in turn is connected to the machine control. In this manner, the condition or state of the work piece may be measured or tested directly in the straightening apparatus, whereby the straightening data are determined and, if necessary, constantly corrected.

In the apparatus according to the invention the arrangement or means for causing the compressive residual stresses in a work piece may comprise hardening means instead of the rolling arrangement as described above. Such hardening means or device, for example an induction coil for heating the work piece, is used to harden a surface layer zone of the work piece. After the surface layer zone of the work piece is heated, the cooling or quenching necessary for achieving the required increase in hardness in the surface layer zone of the work piece can be a simple air cooling or alternatively may be achieved by means of a separate cooling system. The cooling requirements are dependent on the type of material the work piece is made of. This hardening device or means must be able to cause not only the absolute hardness, but also achieve a defined hardening depth of the hardened surface layer zone of the work piece. The technology of hardening a surface layer zone of a work piece is known as such and it is also known, which parameters must be varied in order to achieve an increased hardness in the surface layer zone or an increased or decreased hardening depth of the surface layer zone. Therefore, the hardening techniques will not be discussed in detail here.

The apparatus according to the invention further includes appropriate means for controlling the hardness as such, the hardening depth as well as the location of the hardening operation, in order to achieve an optimal straightening result according to the method of the invention.

BRIEF DESCRIPTION OF THE DRAWINGS

In order that the invention may be clearly understood, it will now be described, by way of example, with reference to the accompanying drawings, wherein:

FIG. 1 is a schematic side view, an axle journal shaft exhibiting an out of true deformation to be straightened according to the method of the invention;

FIG. 2 is a schematic end view of the axle journal of FIG. 1 viewed in the direction of the arrow A in FIG. 1, but omitting the rolling tool;

FIG. 3 is a schematic side view of a crank shaft which is to be straightened according to the invention;

FIG. 4 is an end view of the bearing end portion of the crank shaft in the direction of the arrow B in FIG. 3;

Figure 5:
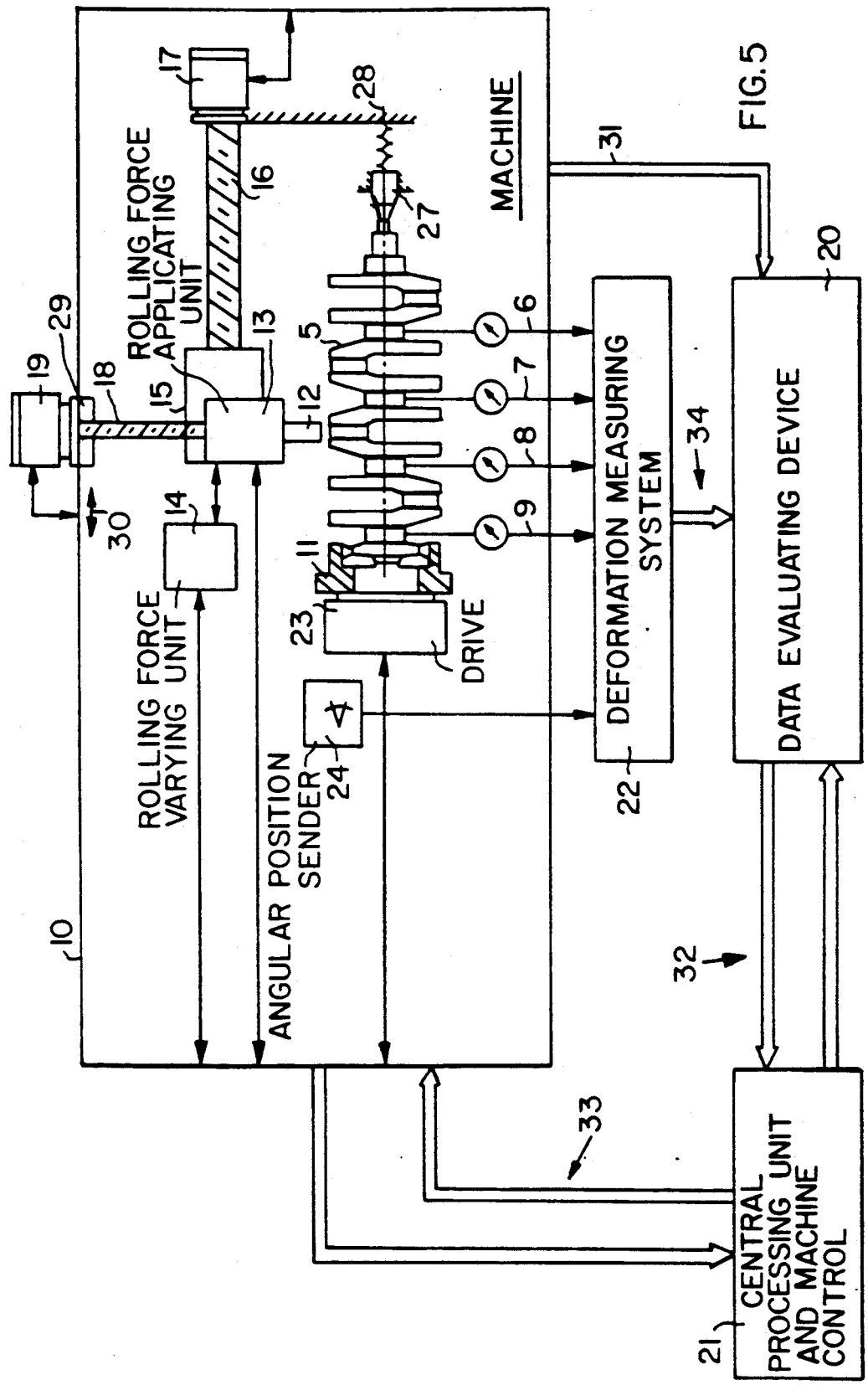
FIG. 5 is a schematic diagram of a machine tool or system for carrying out the method according to the invention.

DETAILED DESCRIPTION OF PREFERRED EXAMPLE EMBODIMENTS AND OF THE BEST MODE OF THE INVENTION

As shown in the side view of FIG. 1 and the end view of FIG. 2 a work piece 1 is a simple stepped shaft such as the end portion of an axle journal, such as the journal or steering knuckle, which is typically used at the steered or front wheels of a motor vehicle. The work piece 1 has an out of true deformation 3 away from its ideal axially straight shape. The deformation 3 of the work piece 1 is to be straightened according to the invention, whereby in this example case, the deep rolling process is shown for inducing the necessary compressive residual stresses in the work piece 1. For this purpose a roller 25 is pressed against the notch or shoulder area 4' which is for example, a transition concave fillet 4' of the circumferential surface 4. The roller 25 is loaded by the force F in the direction shown in FIG. 1 by the arrow F to press against the fillet 4' so that the effective direction of the force F passes through the center of the radius of curvature of the concave fillet 4'. The work piece 1 is rotated about its lengthwise axis and the force F is varied during each rotation of the work piece as shown more distinctly in FIG. 2. In order to achieve the necessary or desired compressive residual stresses, a force F1 is applied over the circumferential angular range $\beta 1$, whereas a smaller force F2 is applied over the circumferential angular range $\beta 2$. Here, the angular range $\beta 1$ extends on the side of the work piece 1 toward which the work piece is bent, while the angular range $\beta 2$ extends around the side of the work piece from which the work piece is bent away. Since the force F1 is greater than the force F2, greater compressive residual stresses are induced in a surface layer zone of the work piece 1 over the angular range $\beta 1$ than over the angular range $\beta 2$. Thus, the formation 3 of the work piece 1 is at least reduced or even completely eliminated as the compressive stresses attempt to relax or become effective in the work piece. The forces are so selected that compressive residual stresses are induced only in a surface layer zone 2. Moreover, the force F2 which acts upon the angular range $\beta 2$ of the circumferential surface 4 may already be large enough that a sufficient rolling hardening effect is achieved to produce a desired increase in the fatigue strength of the work piece 1. However, in order to achieve the desired straightening effect, it is still necessary that the force F1 is sufficiently greater than the force F2. As the dimensions of the roller 25 remain the same, the forces F1 or F2 produce an exactly determined specific rolling force in a zone of the circumferential surface 4 of the work piece 1. In order to increase the compressive residual stresses in the surface layer zone 2 of the work piece 1, the specific rolling force applied by the roller 25 must be increased. Such an increase of the specific rolling force can be achieved in that, for example, the diameter of the roller 25 is reduced according to the rule of Hertzian surface compression or stress. With such a decreased roller diameter, an increased specific rolling force is achieved while the force F1 or F2 is respectively maintained the same so as to achieve a correspondingly increased compressive residual stress in the work piece 1 without increasing the depth of the surface layer zone 2 in which the compressive residual stresses are induced. If instead, the diameter of the roller 25 is maintained the same and the force F1 or F2 is respectively increased, then the specific rolling force is again increased and therewith an increased compressive residual stress is achieved in the work piece. However, in this case, the increased compressive residual stresses extend deeper into the surface layer zone 2 or rather the surface layer zone 2 becomes deeper.

However, it is also possible, while maintaining the same compressive residual stresses, to achieve an increased depth of the residual stresses or in other words to increase the depth of the surface layer zone 2 through which a corresponding compressive residual stress is effective. This can be achieved, in that the diameter of the roller 25 is increased and the force F1 or F2 is respectively increased until the originally provided specific rolling force is again achieved or rather is maintained. In other words, the increased roller diameter and the increased applied force balance each other out to achieve the same specific rolling force. In this manner, the compressive residual stresses in the work piece also reach the originally provided values but to a greater depth or with an increased thickness of the surface layer zone 2.

Instead of the roller 25 a different hardening apparatus could be provided, for example, a hardening apparatus which uses a laser beam of an appropriate variable energy in order to locally heat and thereby harden the work piece. A hardening operation such as this laser heat hardening operation, carried out in the surface layer zone 2 of the work piece 1 in the same area 4' as described above for the operation of the roller 25, similarly achieves a corresponding increased compressive residual stress in the work piece and thereby achieves the desired straightening effect. The magnitude of the straightening effect can be influenced by the corresponding magnitude of the hardness as such and/or the penetration depth of the hardened surface layer zone 2. This is achieved for example by adjusting the power input to the laser or by varying the time of impingement of the laser beam on one location.

The hardening operation as well as the rolling operation for carrying out the straightening process according to the invention can be carried out on a work piece in which the areas in which the increased compressive residual stresses are to be induced have already been strengthened in a prior hardening or hard-rolling operation. In such a case it is simply necessary that the corresponding parameters for the following hardening operation or rolling operation, which is to achieve the desired straightening effect, are increased sufficiently, so that the compressive residual stresses in the desired areas of the work piece are actually increased over the initial level. The exact angular ranges $\beta 1$ and $\beta 2$ over which the hardening or rolling operations are to be varied, can be determined by simple experiments.

As shown in the side view of FIG. 3 and the partial end view of FIG. 4 the above described method can advantageously be applied to a crank shaft work piece 1. The shaft end 26 of the crank shaft 1 is bent or out of true in a downward direction or in a direction opposite to the bending of the shaft end of the axle journal shown in FIG. 1. In the example embodiment shown in FIGS. 3 and 4 a deep rolling operation is carried out, in order to straighten the shaft end 26 according to the invention. A roller 25 is again applied with a force F to a shoulder area 4' which may, for example, be a concave fillet 4'. A rolling force F1 is applied over an angular range $\beta 1$ and a smaller roll force F2 is applied over an angular range $\beta 2$. Insofar as the entire shoulder area 4' of the crank shaft 1 has already been previously subjected to a deep rolling operation, the force F1 must be correspondingly increased above the force applied for the hard rolling operation, which is equal to or which is provided by the force F2 applied over the angular range $\beta 2$. Furthermore, a corresponding hardening operation may be substituted for the rolling operation described here in a manner similar to that described above, with reference to FIGS. 1 and 2.

FIG. 5 shows schematically a machine tool system for performing the method of the invention. A machine base 10 includes a work piece rotational drive 23 with a work piece clamping device or chuck 11. A work piece 5, which is, for example, shown as a crank shaft 5, is held between the clamping device 11 and a dead center point 27. The rotational angular position of the work piece drive 23 and therewith the angular position of the work piece 5 is monitored by an angular position sender or sensor 24 which transmits a signal to a deformation measurement system 22. In this context, it must simply be assured, that the crank shaft work piece 5 is installed or held in the work piece clamping device 11 with a known predetermined rotational angular position relative to the clamping device 11.

The deformation measuring system 22, Model 19010 IC, plus one Model 19002 IC for each measuring station, make Feinprüf GmbH for example, includes measuring stations 6, 7, 8, and 9 Model 1300, make Feinprüf GmbH. Each measuring station 6 to 9 includes a measuring device arranged at an appropriate location of the crank shaft 5, for example, at each of the main bearing journals of the crank shaft as shown in FIG. 5, to measure the out of true deviation of the crank shaft 5. More specifically, the magnitude of any radially directed out of true deformation is measured. The measuring stations 6 to 9 transmit a signal corresponding to the measured information to the deformation measuring system 22, which in conjunction with the information transmitted by the angular position sender 24 is able to determine the rotational angular position of the measured out of true deformations of the work piece 5 at the measured locations.

A rolling tool 12 is arranged to apply a rolling treatment to the work piece 5 according to the method of the invention. A rolling force application unit 13 is operatively connected to the rolling tool 12 so as to apply an appropriate rolling force. The rolling tool 12 and the force application unit 13, are generally known in the art and hence will not be more closely described.

The rolling force application unit 13 is arranged on a carrier 15 e.g. European Application No. 86100404.2 and can be driven by the carrier 15 in the direction of the work piece axis 28, for example, by means of a ball worm spindle 16 with an associated spindle drive 17. The spindle drive 17 has a rotational position indicator which gives information corresponding to the respective position of the carrier 15, whereby the carrier 15 may be correctly positioned. The rolling force applying unit 13 may also be arranged in a stationary manner, if the rolling operation is always to be carried out at the same axial position or location of the work piece. Thus, it is also possible to arrange a plurality of stationary force applying units at the respective desired axial rolling location.

The rolling force applying unit 13 in turn is driveable in a radial direction perpendicular to the work piece axis 28 by means of the ball worm spindle 18 with an associated spindle drive 19. In order to allow a simultaneous axial and radial motion of the force applying unit 13, and thus of the rolling tool 12, the spindle drive 19 is arranged on a carriage 29, which is movable in the direction shown by arrow 30. Just as for the spindle drive 17, the spindle drive 19 also has a rotational position indicator for indicating the radial position of the rolling force applying unit 13 with the rolling tool 12 for allowing the accurate radial positioning of the rolling tool 12.

The data from the measuring stations 6 to 9 and from the angular position sender 24 are transmitted by the deformation measuring system 22 to a data evaluating device or circuit 20 through a data channel or bus 34. The rotational position indicators, which cooperate with the spindle drives 17 and 19, but which are not shown or referenced in detail, provide data regarding the respective momentary position of the rolling force applying unit 13 and the carrier 15 to the data evaluating device 20 through the data bus 31.

The rolling force applying unit 13 is connected to a rolling force control unit or varying unit 14 servo valves, model 4WS2EM10-4x/20B2T315Z8 D/M, Amplifiers for servo valves VT1600-S31 Rexroth, GmbH adjust the rolling force. If necessary, the rolling force can even be varied by means of the rolling force control unit 14 during the course of any single rotation of the work piece. Such a variation of the rolling force during each rotation of the work piece is often or even usually necessary as described above with reference to FIGS. 1 to 4.

The data evaluating device 20 receives data from and transmits data to a machine control 21 via a data bus 32. The machine control 21 is a central processing unit which, in conjunction with the data evaluating device 20 controls the operation of the entire machine with regard to the position of the separate components as well as regarding the rotational speed, the number of rolling passes, the rolling force and rolling force variations, and the succession of locations to be straightened. The data evaluating device 20 may include a computer, which may be freely programmable. A computer Model SMP-BUS system, manufactured by Siemens is suitable for the present purposes. In this manner, it is possible to perform various pre-programmed straightening procedures. In special cases, when the state of the work piece in the machine has been determined or is otherwise known, a specially programmed straightening operation may be performed corresponding to the respective state or condition of the current work piece. The control of the machine by the machine control or CPU 21 Siemens SIMATIK S5-15OU and SINUMERIK 850T is achieved through the data buses 32, 33, 31, and 34. While the data buses 32 and 33 allow transferring data in both directions, the data buses 31 and 34 only supply data to the data evaluating device 20 and do not allow transmission of data from the data evaluating device 20. The separate data connections, data flow directions and movement directions between the various components of the machine 10 and the peripheral control devices 20, 21, and 22 are merely schematically indicated by thin arrow lines in FIG. 5, whereby the outer schematic boundary of the machine 10 also represents a data transmission connection.

The apparatus according to the invention may include a plurality of independent units, or may represent a single contained machine. For example, the deformation measuring system may as such be an independent unit arranged to cooperate with an independent and separate straightening unit. This straightening unit may be embodied as a rolling machine as described above or alternatively as a hardening machine. Separate from the independent units mentioned here, a further independent hardening machine or rolling machine may be arranged to achieve a desired strength characteristic of the work piece prior to the straightening operation. Such a prehardening or prestrengthening operation should be carried out prior to or arranged ahead of the deformation measuring system, because the prestrengthening hardening operation or rolling operation is expected to cause a deformation of the work piece which should be measured to then be trued or straightened.

Figure 6A:
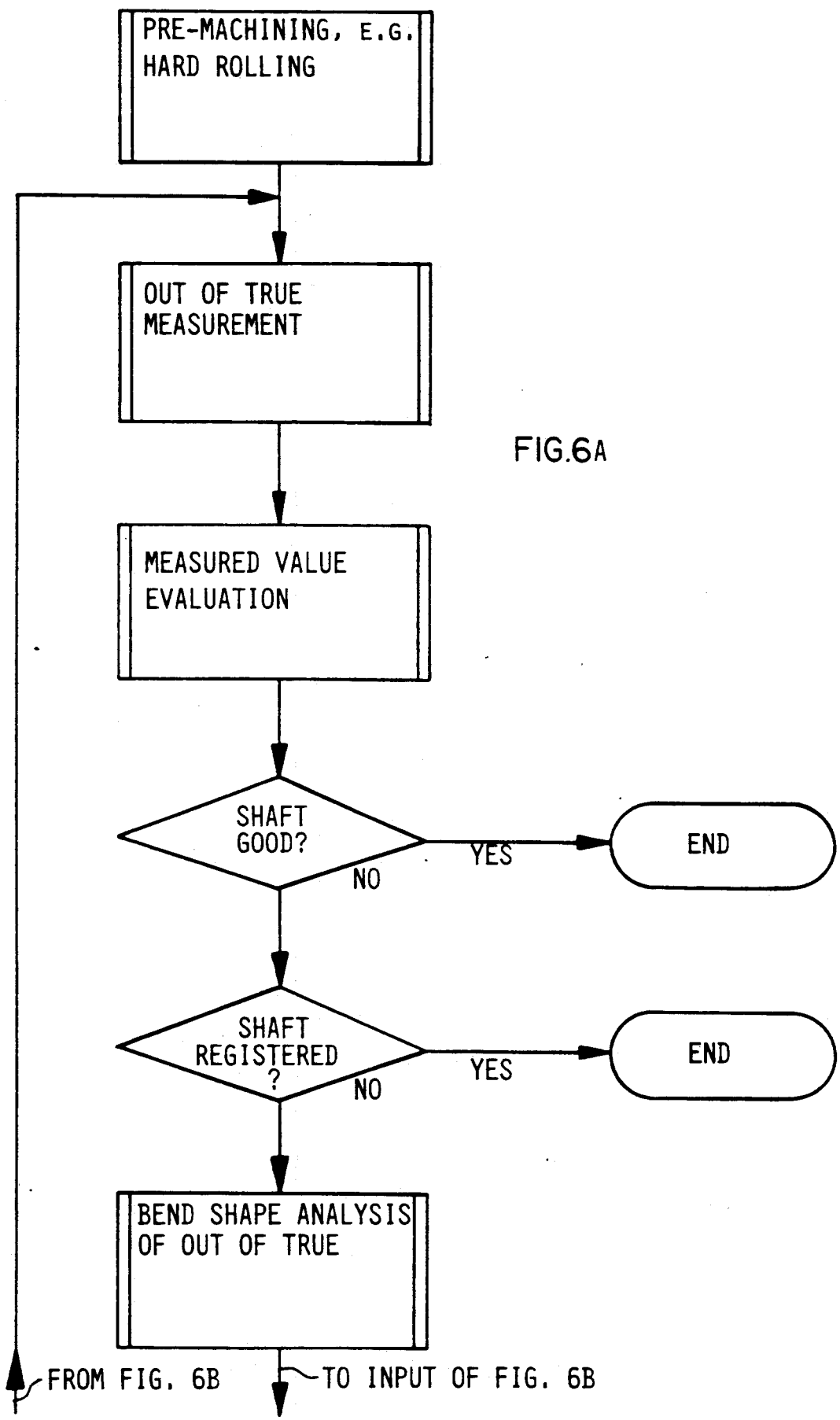
FIG. 6 is a flow chart depicting the process steps involved in straightening an out of true work piece according to the invention.
Figure 6B:
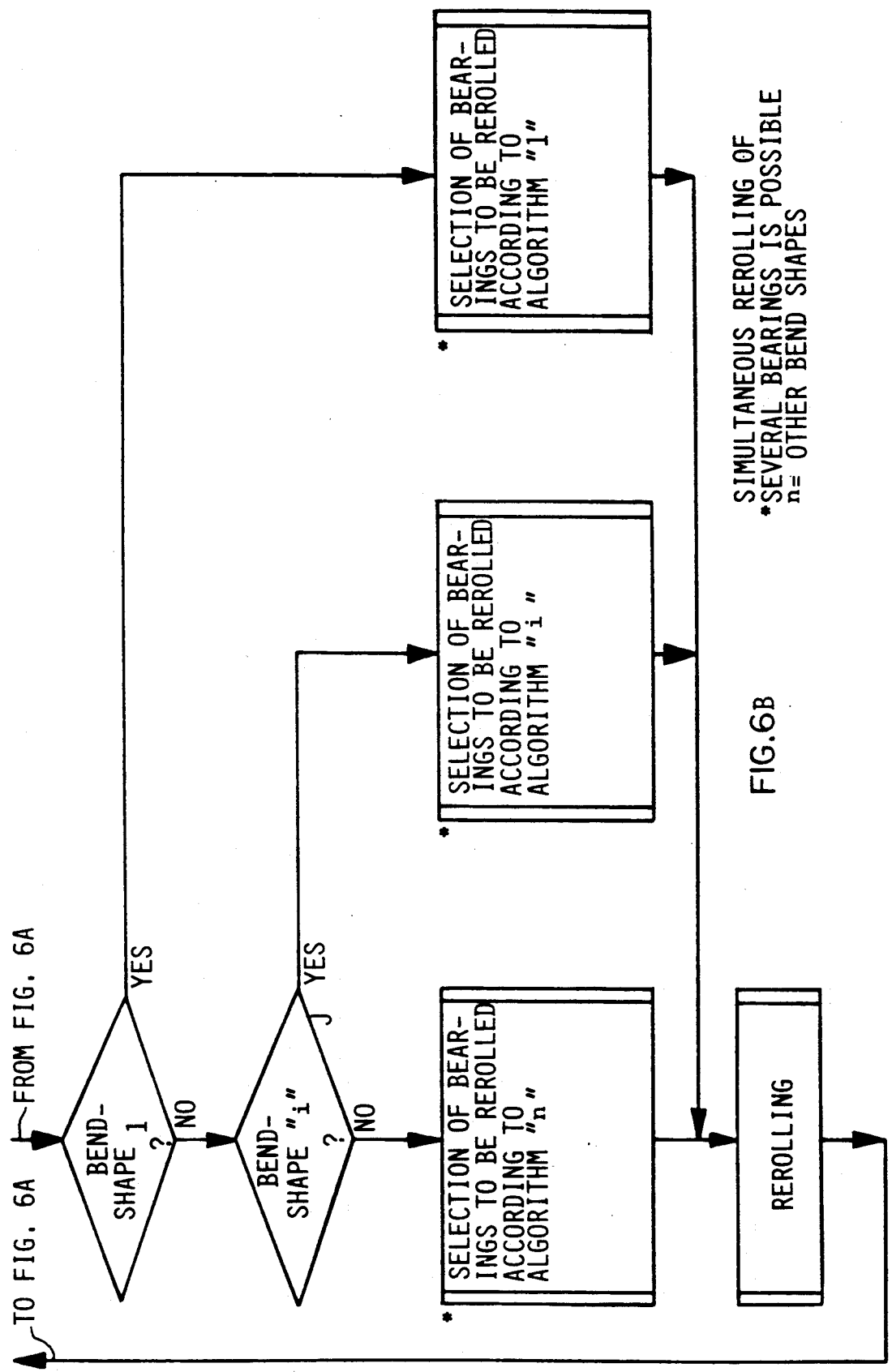

FIG. 6 is a flow chart representing an example sequence of steps in the method according to the invention. The various successive method steps may, for example, be programmed in the machine control central processing unit 21 and carried out by means of the apparatus described above, to true or straighten a work piece such as a shaft. As shown in FIG. 6, a shaft work piece is first subjected to a pre-machining step, such as a deep rolling operation. This machining may cause an undesirable out of true deformation in the work piece. In the next step any out of true deformation is measured and is subsequently evaluated. If the evaluated deformation falls within an allowable tolerance range, then the shaft is "good" and requires no further treatment. If, however, the out of true deformation is unacceptably large, then the shaft is "bad" and will be further analyzed and/or processed.

If the deformation is too large to be effectively trued or straightened, then the shaft is rejected for remachining or as scrap. If, instead, the deformation is not excessively large, then the shaft is passed on to a bend-shape analysis of the out of true deformation. The shaft may comprise several bend deformations, for example, it may be deformed separately at each bearing journal area. The deformation bend shape at each bearing journal is determined as a closest fit to one of a number of pre-programmed bend shapes defined by algorisms "n", or "i", or "1". Any measured bend deformation matching the pre-programmed first shape corresponding to algorism "1" is selected for treatment such as a rolling operation according to a corresponding first rolling algorism "1". Any bend deformation of an ith or nth shape is similarly selected for treatment according to an ith or nth rolling algorism. Each rolling algorism specifies a rolling force, number of rolling passes, location of rolling passes, rolling area boundaries, roller diameter, etc. appropriate for straightening the corresponding deformation. The rolling algorism data are stored in and executed by the machine control or CPU 21.

After the necessary rolling operations have been carried out, the shaft work piece is returned to the initial measuring step in order to measure any out of true deformation which may still exist. If necessary, the analysis and any necessary treatment is repeated as described above, until the work piece has been straightened sufficiently to be within an acceptable tolerance range as a "good" shaft.

Figure 7:
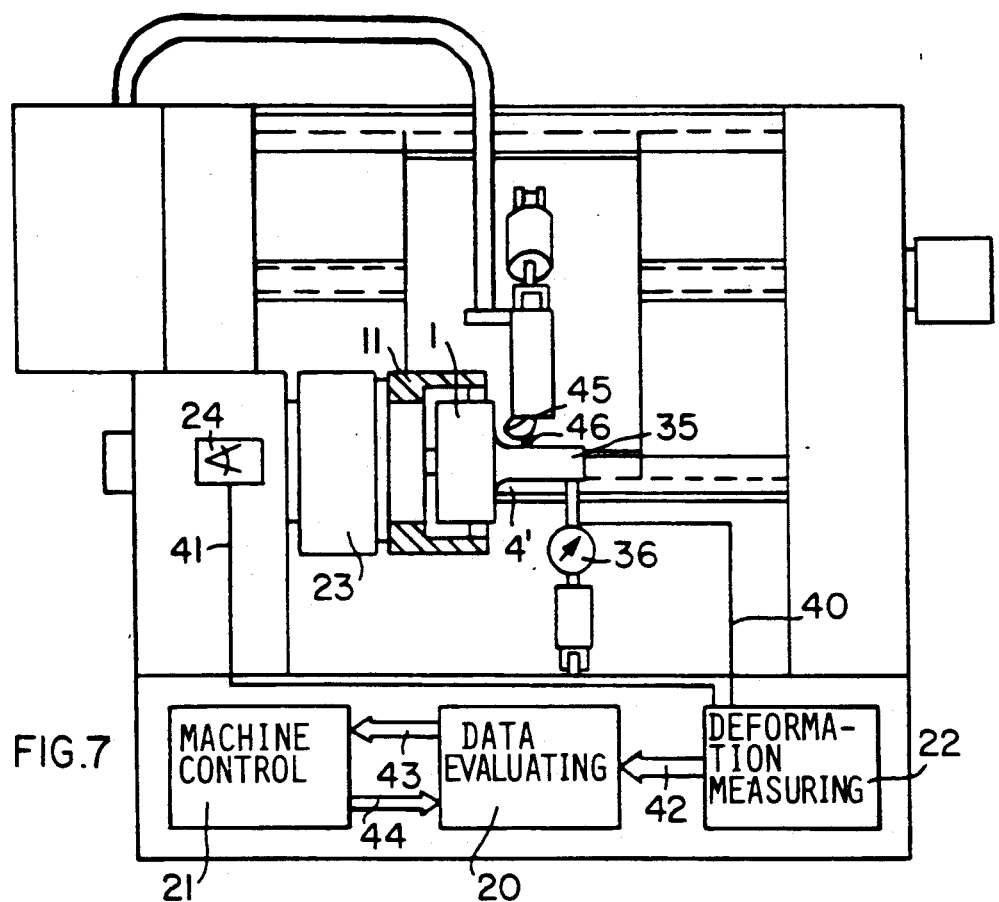
FIG. 7 is a front view of an apparatus for hardening a work piece.
Figure 8:
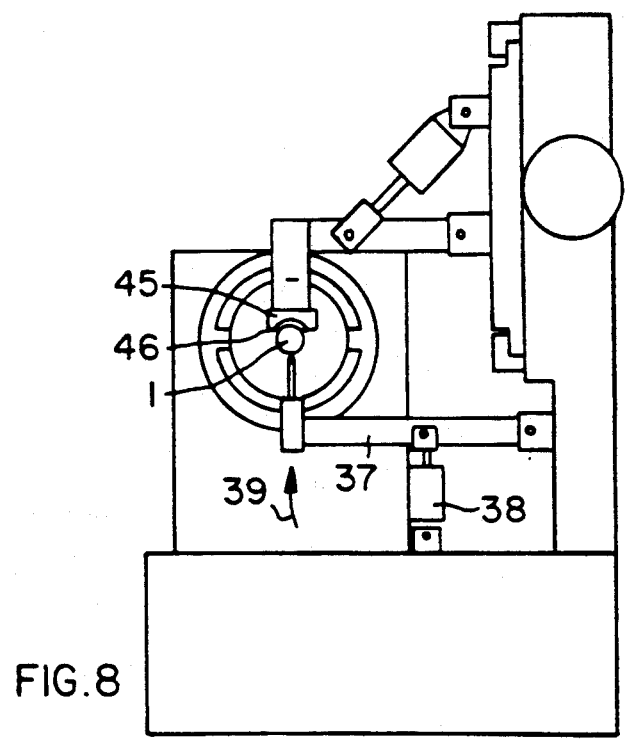
FIG. 8 is an end view of the apparatus of FIG. 7.

In FIGS. 7 and 8 a machine is shown which is constructed for increasing the fatigue strength of a work piece by hardening while avoiding or removing a possible out-of-round (or imbalance) occurring on a work piece journal. The rotational drive 23 holds a work piece 1 as shown in FIG. 1 with the work piece clamping device 11 for applying compression stress in the fillet 4' by applying a hardening method.

The machining (or operational) sequence shall be described in the following. The work piece 1 clamped by the clamping device 11 is being rotated by the rotational drive 23. In order to determine at the beginning of the work piece treatment whether or not the journal 35 has an imbalance, a measuring sensor 36, mounted on a lever 37, is tilted in the direction of the arrow 39 into a working position on the work piece 1 with the aid of the flow means cylinder 38. Any imbalance present is measured by the measuring sensor 36 and the imbalance size is transmitted to the deformation measuring system 22 through a conductor 40. The deformation measuring system 22 ascertains through the conductor 41 in connection with the angle sensor 24 the corresponding angular position of the measured imbalance. The data ascertained by the measuring sensor 36 and by the angle sensor 24 are supplied to the data evaluating device 20 through the conductor 42. The data evaluating device 20 cooperates with the machine control 21 through conductors 43 and 44 by exchanging data. Based on the measured data, the machining data are controlled in closed loop fashion depending on the angle and in accordance with the software entered into the control 21, so that the internal (eigen) stresses produced in the work piece by hardening increase the fatigue strength of the work piece, while simultaneously making the present imbalance smaller, so that the imbalance is within a permissable tolerance range. The parameter to be controlled in closed loop fashion may be the current, the voltage, the gap 46 between the induction coil 45 and the work piece 1, the cooling of the heated work piece 1, and the combination of these parameters at least partially. For example, during the heating of the work piece the induction coil 45 is positioned with a defined minimal spacing from the work piece 1 in certain angular positions of the work piece 1 while being positioned at a larger spacing from the work piece 1 throughout the remaining work piece circumference. This operation is repeated as often as necessary until the desired temperature distribution on the work piece 1 has been reached. Thereafter the work piece 1 is being cooled for the hardening and thus the operation for increasing the fatigue strength while taking into account the journal imbalance is completed.

Although the invention has been described with reference to specific example embodiments, it will be appreciated, that it is intended to cover all modifications and equivalents within the scope of the appended claims.

What I claim is:

1. A method for straightening a work piece having different cross-sections along its length with fillets forming transition areas between neighboring different cross-sections, said work piece having a rotational axis and a bend relative to said rotational axis, said bend being determined by three values, namely as to its location by an axial coordinate value, as to its direction by an angular coordinate value, and as to its size by an eccentricity magnitude value, comprising the following steps:
   (a) first introducing into said fillets of said work piece first residual compressive stresses in a surface layer zone for increasing a fatigue strength of said work piece,
   (b) determining from said three values a respective control signal which represents a circumferentially limited angular range ($\beta 1$) around a portion of at least one of said fillets requiring the introduction of further residual compressive stress for said straightening, and
   (c) second introducing in response to said control signal, in addition to said first residual compressive stresses in said surface layer zone, second residual compressive stresses by a hardening operation only in that part of said surface layer zone of said at least one fillet determined by said limited angular range ($\beta 1$), whereby said first residual compressive stresses are increased by said second residual compressive stresses in said surface layer zone determined by said limited angular range ($\beta 1$) so that said bend is at least reduced or removed and any fatigue strength caused by said first residual compressive stresses is maintained without relieving said first residual compressive stresses by said second residual compressive stresses whereby any remaining stresses are exclusively residual compressive stresses in said surface layer zone, and performing said hardening operation by heating said surface layer zone in said limited angular range ($\beta 1$), and then cooling the heated surface layer zone.

2. The method of claim 1, further comprising increasing an effect of said second residual compressive stresses by increasing a radial depth of said second residual compressive stresses in said surface layer zone.

3. The method of claim 1, further comprising increasing an effect of said second residual compressive stresses by increasing the magnitude of said second residual compressive stresses.

4. The method of claim 1, comprising introducing said first residual compressive stresses into said work piece by a preliminary fatigue strength increasing operation.

5. The method of claim 4, comprising introducing said first and second residual compressive stresses in a single machine tool substantially simultaneously in response to a program.

6. The method of claim 1, further comprising testing at least a random number of not yet straightened sample work pieces to determine correction values from which said control signal is formed, based on said eccentricity magnitude and on said angular coordinate value which determines a direction of said bend in an initial state of said work piece, and controlling said heating in response to said control signal including said correction values.

7. The method of claim 6, comprising straightening a series of similar work pieces without changing said controlling.

8. The method of claim 1, further comprising testing a work piece after said hardening step has been performed by heating to measure at least said eccentric magnitude and said angular coordinate which determines a direction of said bend for providing further correction values for correcting said control signal, and performing a further straightening operation under the control of said further correction values, and repeating said testing and straightening operation until said bend is reduced to an acceptably small level.

9. The method of claim 8, comprising performing more than two sequential straightening operations on the work piece, each straightening operation being performed with a constant adjustment step.

10. The method of claim 1, further comprising testing said work piece at a plurality of locations along said work piece length for ascertaining the largest bend, and then performing said first introducing first at a location of said largest bend.

11. The method of claim 1, wherein said heating is controlled by controlling at least one of the following: a heat source for applying heat to said work piece prior to a cooling, a laser light energy applied to said work piece prior to cooling, and a quenching intensity.

12. A method for straightening a work piece having different cross-sections along its length with fillets forming transition areas between neighboring different cross-sections, said work piece having a rotational axis and a bend relative to said rotational axis, said bend being determined by three values, namely as to its location by an axial coordinate value, as to its direction by an angular coordinate value, and as to its size by an eccentricity magnitude value, comprising the following steps:

(a) performing a first heating operation in at least one of said fillets for introducing into a work piece first residual compressive stresses in a surface layer zone for increasing a fatigue strength of said work piece, (b) determining from said three values a respective control signal representing a circumferentially limited angular range ($\beta 1$) around a portion of said at least one of said fillets, and (c) performing a second heating operation on said at least one fillet of said fillets for introducing in response to said control signal, in addition to said first residual compressive stresses in said surface layer zone, second residual compressive stresses in that part of said surface layer zone determined by said limited angular range ($\beta 1$) of said at least one fillet, whereby said first residual compressive stresses are increased by said second residual compressive stresses in said surface layer zone of said at least one fillet determined by said limited angular range ($\beta 1$) so that said bend is at least reduced or removed and any fatigue strength caused by said first residual compressive stresses is maintained without relieving said first residual compressive stresses by said second residual compressive stresses, and wherein said first and second heating operations are performed by heating said surface layer zone, said second heating operation applying heat only in said limited angular range ($\beta 1$) of said at least one fillet, and then cooling the heated surface layer zone for hardening, whereby exclusively compressive residual stresses remain in said surface layer zone.

* * * * *